UNITED STATES PATENT OFFICE.

JACOB J. LAVO, OF WYANDOTTE, KANSAS, ASSIGNOR, BY MESNE ASSIGNMENTS, TO UNITED STATES CHEMICAL COMPOUND COMPANY, OF SAME PLACE.

IMPROVEMENT IN COMPOUNDS FOR PREVENTING INCRUSTATION IN STEAM-BOILERS.

Specification forming part of Letters Patent No. 137,935, dated April 15, 1873; application filed August 28, 1872.

To all whom it may concern:

Be it known that I, JACOB J. LAVO, of the city and county of Wyandotte, State of Kansas, have invented a certain Compound called Lavo's chemical solution for preventing and removing the accumulation of scales and incrustations in steam-boilers, of which the following is a specification:

The nature of the invention of said compound consists in mixing concentrated lye in any one of its various forms with lubricating-oil and ordinary brown or white sugar with water so as to produce the compound intended.

To prepare this—Lavo's chemical solution, for the purposes above specified—take seven gallons of fresh water, in a kettle of the capacity of ten gallons or more; this quantity of water (or larger, according to the quantity of the solution to be made) heated to the boiling-point. To this boiling water, viz., seven gallons, add thirty pounds of concentrated lye. When this mixture has become perfect by the dissolving of the lye, add to this one gallon of lubricating-oil, and boil this mixture from seven to ten minutes, and also forty-five pounds of brown or white sugar, refined or otherwise. When the combination of these various ingredients has become perfect the solution is ready for use, and to produce the results desired and claimed. To effect this one pint of this solution is mixed with the water intended to be used and injected into the boiler of the engine for all purposes, whether for railways, steamships, mechanical, or other purposes, at the rate of one pint of the solution to every twenty-five barrels of water, and this last-named combination is to be used in the generating of steam for the purposes above named; and when so used, in less or greater quantities, the ratio of combination is always the same, substantially, entirely removing and preventing the deleterious accumulation of scales and incrustations of lime and other foreign substances in the interior of the boiler.

I am aware that oleaginous, alkaline, and saccharine matters have before been used for preventing incrustation, and therefore do not claim this broadly; but I produce a superior composition by first boiling together oil and lye, so that they will form a homogeneous body, and then mixing saccharine matter therewith.

I claim as my invention—

The compound hereinbefore described, consisting of lye, oil, and sugar, when produced by boiling together the lye and oil to form a saponaceous liquid, and then adding the sugar or its equivalent, in about the proportions specified.

JACOB J. LAVO.

Witnesses:
JOHN K. HALE,
A. B. BARTLETT.